(12) United States Patent
Matsuda et al.

(10) Patent No.: US 6,499,550 B2
(45) Date of Patent: *Dec. 31, 2002

(54) WORKING VEHICLE HAVING DETACHABLE PANEL COVER

(75) Inventors: Takuya Matsuda, Osakasayama (JP); Nobuyuki Toshikuni, Neyagawa (JP); Hidetaka Yoshioka, Osaka (JP); Taichi Fujiwara, Izumi (JP); Noriyuki Miyamaru, Sakai (JP); Yasunobu Yamaue, Izumi (JP); Mamoru Kawaguchi, Sakai (JP); Mikio Ishida, Osaka (JP)

(73) Assignee: Kubota Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,007

(22) Filed: Sep. 8, 1999

(65) Prior Publication Data

US 2002/0043414 A1 Apr. 18, 2002

(30) Foreign Application Priority Data

May 26, 1999 (JP) ............................................. 11-146849

(51) Int. Cl.[7] ............................................. B62D 25/14
(52) U.S. Cl. ............................. 180/90; 296/72; 296/196
(58) Field of Search ........................... 180/90; 280/779, 280/780; 296/70, 72, 194, 196, 197

(56) References Cited

U.S. PATENT DOCUMENTS

| | | | | |
|---|---|---|---|---|
| 4,194,587 A | * | 3/1980 | Shino et al. ................... | 180/90 |
| 4,335,798 A | * | 6/1982 | Adickes ........................ | 180/90 |
| 4,447,860 A | * | 5/1984 | Stone et al. ................... | 362/30 |
| 4,685,529 A | * | 8/1987 | Tamura et al. ............. | 180/89.12 |
| 4,759,568 A | * | 7/1988 | Paefgen et al. ............. | 280/732 |
| 4,993,279 A | * | 2/1991 | Doescher et al. ............. | 74/493 |
| 5,479,693 A | * | 1/1996 | Oyama ........................ | 29/469 |
| 5,755,460 A | * | 5/1998 | Barnes et al. ............ | 280/728.3 |

FOREIGN PATENT DOCUMENTS

| | | | | |
|---|---|---|---|---|
| JP | Hei547698 | 12/1993 | ........... | B60K/11/08 |

* cited by examiner

Primary Examiner—Paul N. Dickson
Assistant Examiner—David R. Dunn
(74) Attorney, Agent, or Firm—Webb Ziesenheim Logsdon Orkin & Hanson, P.C.

(57) ABSTRACT

An instrument panel to be mounted at a driver's section of a working vehicle such as a tractor is secured to a frame member which extends upwardly from a main frame. A panel cover for covering a steering-wheel peripheral section of the machine includes an opening through which the instrument panel is exposed to the outside and this panel cover is detachably attached to the frame member.

15 Claims, 7 Drawing Sheets

WORKING VEHICLE HAVING DETACHABLE PANEL COVER

BACKGROUND OF THE INVENTION

The present invention relates to a working vehicle, such as a tractor, and relates more particularly to improvement of a steering-wheel or handle periphery section of a driver's or operator's section of such vehicle.

DESCRIPTION OF THE RELATED ART

An operator's section of a working vehicle is known from e.g. Japanese published utility model gazette No. Hei. 5-47698, in which a panel cover made of synthetic resin is disposed forwardly of a steering wheel, and an instrument panel is attached to a rearward opening formed in the panel cover.

The instrument panel mounts collection of a number of instruments such as an engine tachometer, an oil temperature gauge, as well as various electric devices such as pilot lamps and so on. Hence, the entire instrument panel is a rather heavy component. For this reason, in the case of the prior art such as the one identified above, in order to allow the resin cover to support such heavy panel, various arrangements would be needed, such as attaching a reinforcing metal element to the rear face of the panel, increasing the thickness of the resin forming the panel, or forming a reinforcing rib on the panel.

For the reason above, the freedom in designing the attachment construction to the machine body would be restricted disadvantageously. Moreover, synthetic resin having superior strength is usually inferior in moldability. Hence, use of such resin would present difficulty in obtaining required precision in finish dimensions. Conversely, synthetic resin having superior moldability is usually inferior in strength. Hence, use of such resin would present the difficulty of assuring sufficient strength for supporting the instrument panel. In either way, there was room for improvement.

SUMMARY OF THE INVENTION

In view of the above-described state of the art, a primary object of the present invention is to overcome the above-described drawbacks of the prior art by providing an improved construction having sufficient strength for supporting the panel cover and the instrument panel.

For accomplishing the above object, according to the present invention, there is provided a working vehicle comprising: a main frame; a frame member secured to the main frame; an instrument panel secured to the frame member and having a display face; a panel cover defining an opening for exposing the display face to an operator and covering the periphery of the instrument panel, the panel cover being detachably attached to the working vehicle.

According to the construction described above, the instrument panel is secured to the frame member which in turn is secured to the main frame, so that there is no necessity of providing significant reinforcement to the panel cover. Therefore, the panel cover may be manufactured more easily and the instrument panel may be supported with sufficient strength at the same time.

Further and other objects, functions and effects of the invention will become apparent from the following description of one preferred embodiment of the present invention with reference to the accompanying drawings.

DETAILED DESCRIPTION OF THE PREFERRED EMBODIMENT

A preferred embodiment of the present invention will now be described in details with reference to the accompanying drawings.

In the following description of the invention, the direction-related terms "front", "rear", "right" and "left" all mean those respective directions relative to a tractor.

The tractor includes a pair of steerable front wheels 1, a pair of driving rear wheels 2, an engine 3, a driver's section 4, a lift arm 5, a steering wheel 6, an engine hood 7, a fuel tank 8, a panel cover 9, an instrument panel 10, a driver's seat 11, floor steps 12, a pair of rear-wheel fenders 13, a protection guard member (roll-over protective structure or "ROPS") 14 for protecting the driver in case of a roll-over accident of the vehicle, and a transmission casing 35 equipped with propelling GST.

Figure 3:
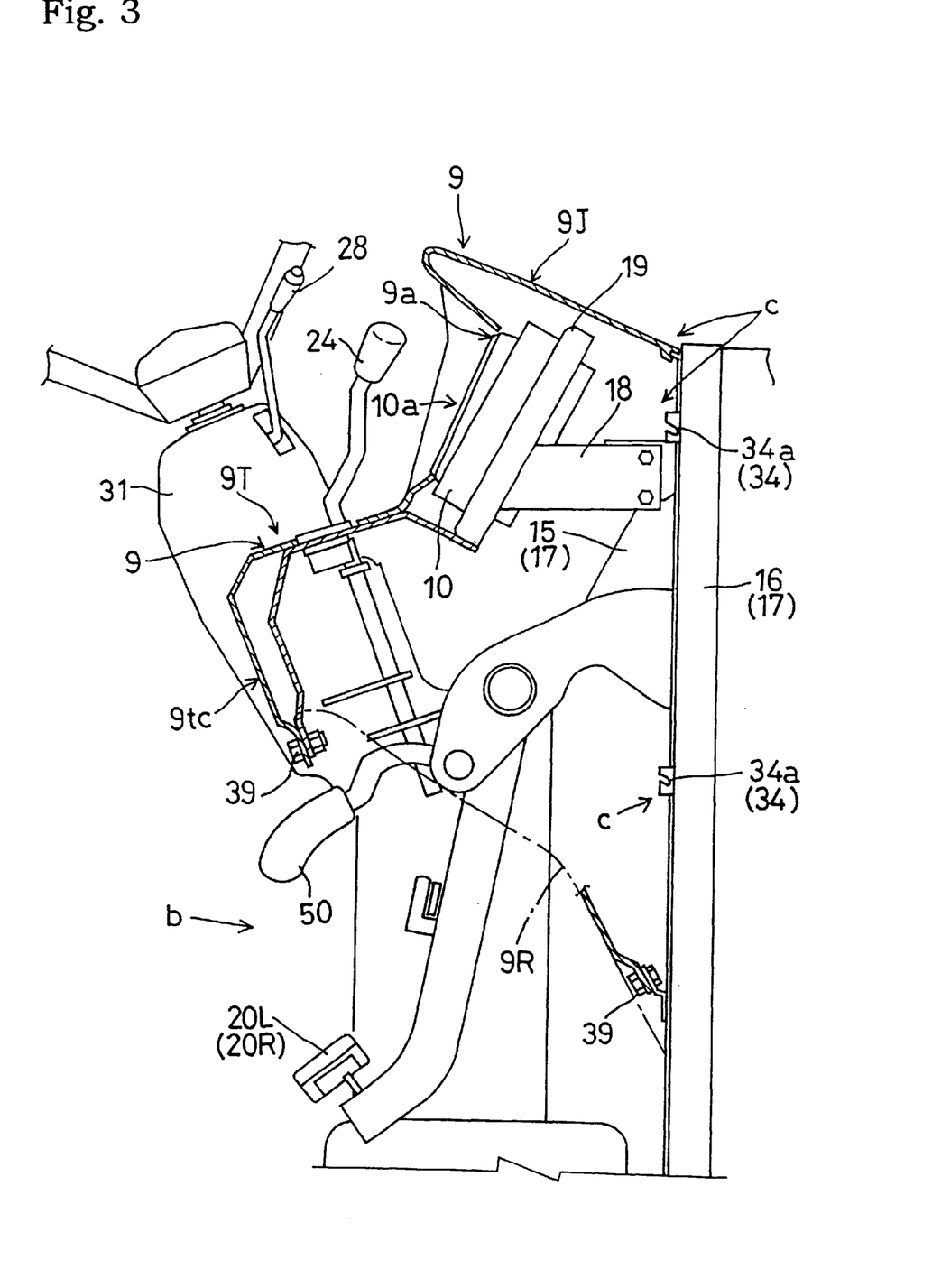
FIG. 3 is a partially cutaway side view of the steering-wheel peripheral section.
Figure 6:
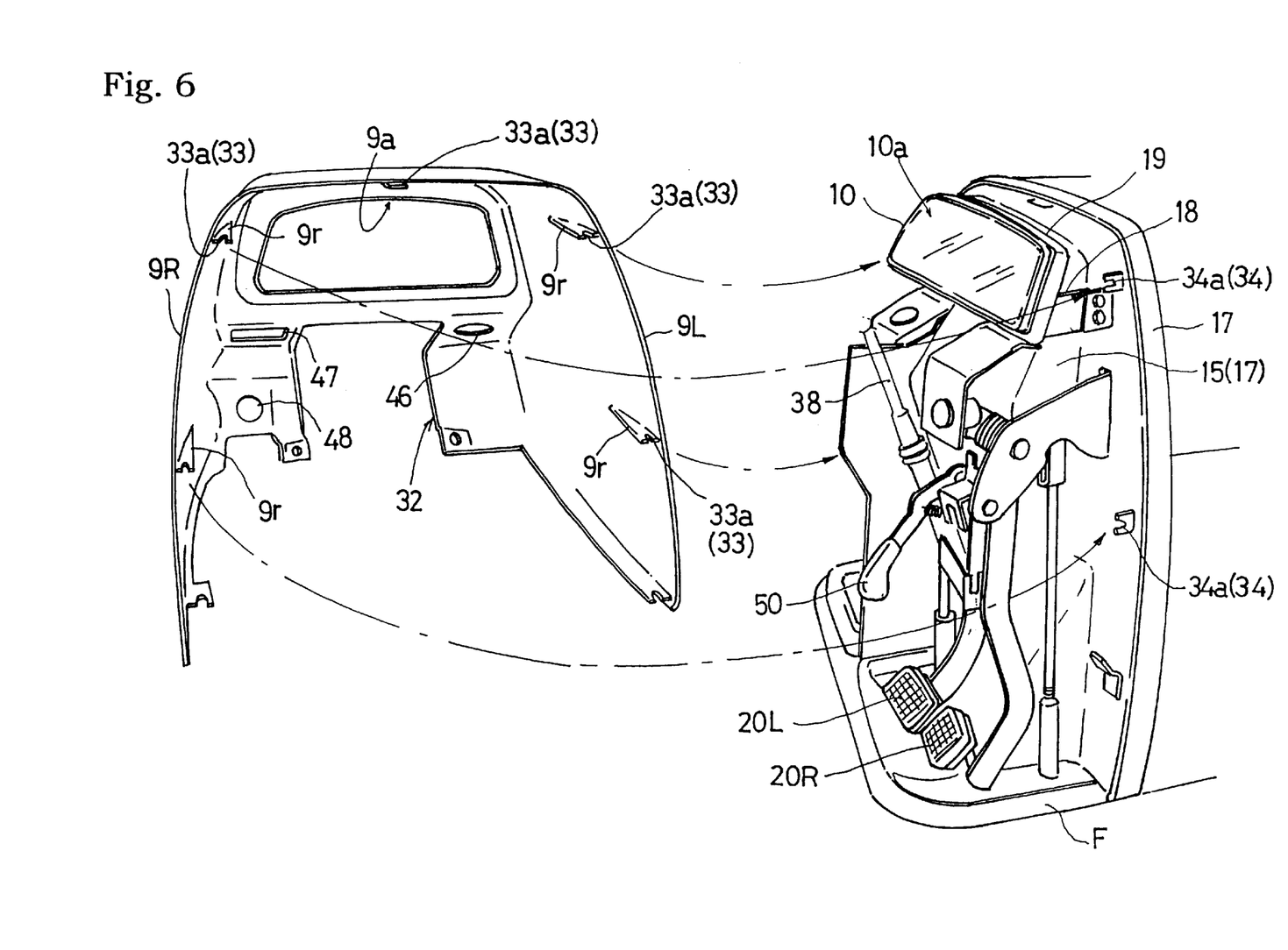
FIG. 6 is an exploded perspective view illustrating attachment relationship between the panel cover and the steering-wheel peripheral section.

As shown in FIGS. 3 and 6, an engine section (a) in which the engine 3, the fuel tank 8 and so on are mounted and a steering-wheel peripheral section (b) facing the driver's section 4 are partitioned from each other in the front-rear direction by means of a partition wall 15 therebetween. A generally downwardly opening U-shaped frame member 16 is disposed erect from a main frame F. The partition wall 15 is integrally fixed to the inner side of the frame member 16. The frame member 16 and the partition wall 15 together constitute a vehicle frame 17. Incidentally, this tractor is provided with the ROPS feature, having the guard member 14.

As shown in FIGS. 2 through 6, the instrument panel 10 is fixedly disposed at the upper portion of the steering-wheel peripheral section (b) and the panel cover 9 defines an opening 9a through which the display face 10a of this instrument panel 10 may be viewed. The panel cover 9 may be mounted to the steering-wheel peripheral section 9b with registering the opening 9a thereof with the display face 10a. Also, the panel cover 9 may be detached from the steering-wheel peripheral section (b). In this way, the panel cover 9 is attachable to and detachable from the steering-wheel peripheral section (b).

A front edge of this panel cover 9 is configured along the outer periphery of the U-shaped frame member 16.

Figure 4:
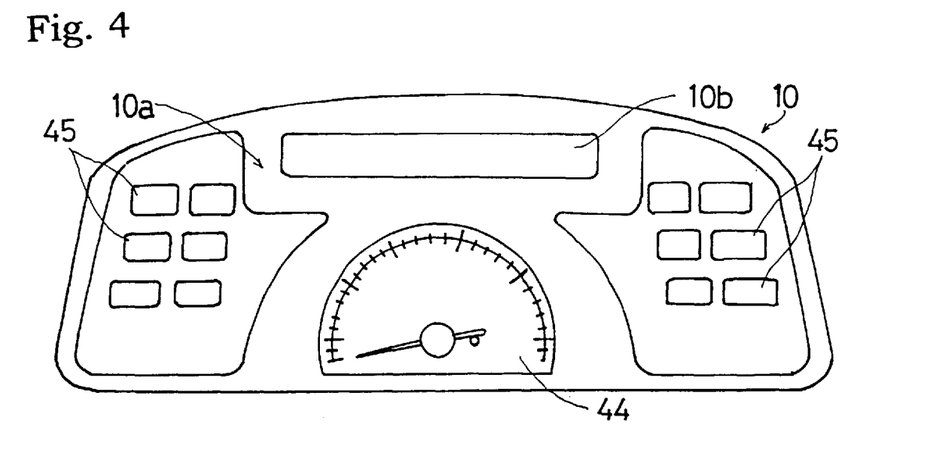
FIG. 4 is a plan view showing an instrument panel alone.
Figure 5:
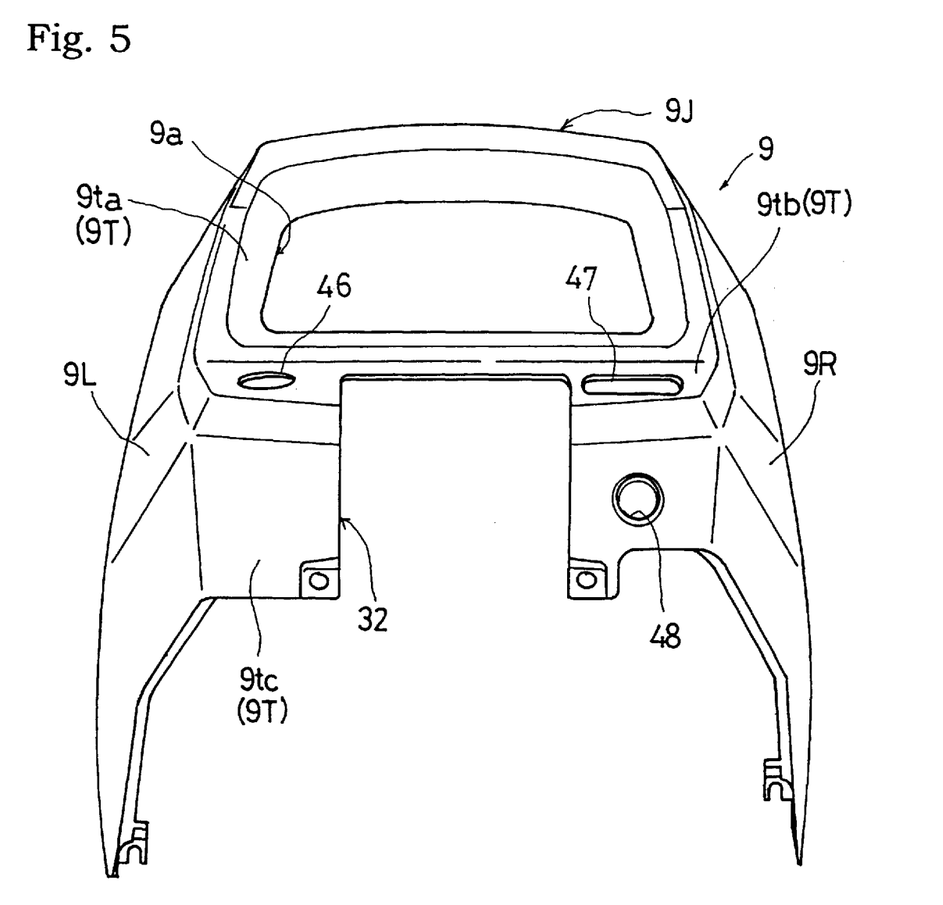
FIG. 5 is a plan view showing a panel cover alone.

The instrument panel 10 is secured to a loop-shaped member 19 which is bolt-connected to an upper rear face portion of the vehicle frame 17 via a pair of right and left stays 18, 18. The right and left stays 18, 18 extend substantially horizontally from the vehicle frame 17. The vehicle frame 17 supports various control instruments constituting the steering-wheel peripheral section (b) and also detachably supports the panel cover 9. As shown in FIG. 4, the instrument panel 10 mounts various components such as a tachometer 44 disposed centrally of the panel, a liquid-crystal display section 10b disposed upwardly of the tachometer, and a plurality of indicator lamps 45 arranged on the right and left-hand sides of the tachometer 44.

Figure 1:
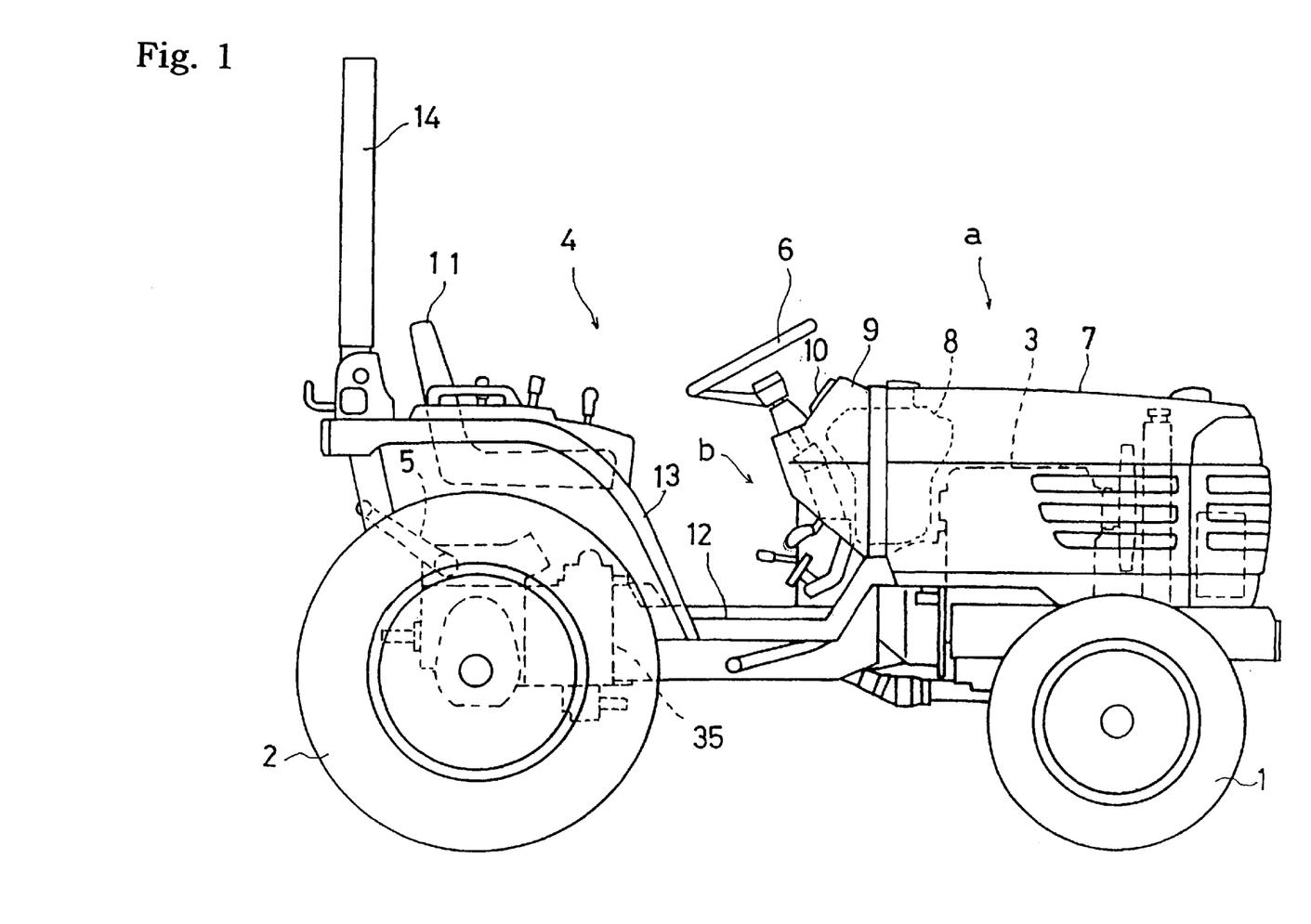
FIG. 1 is a side view of a tractor having a construction according to the present invention.
Figure 2:
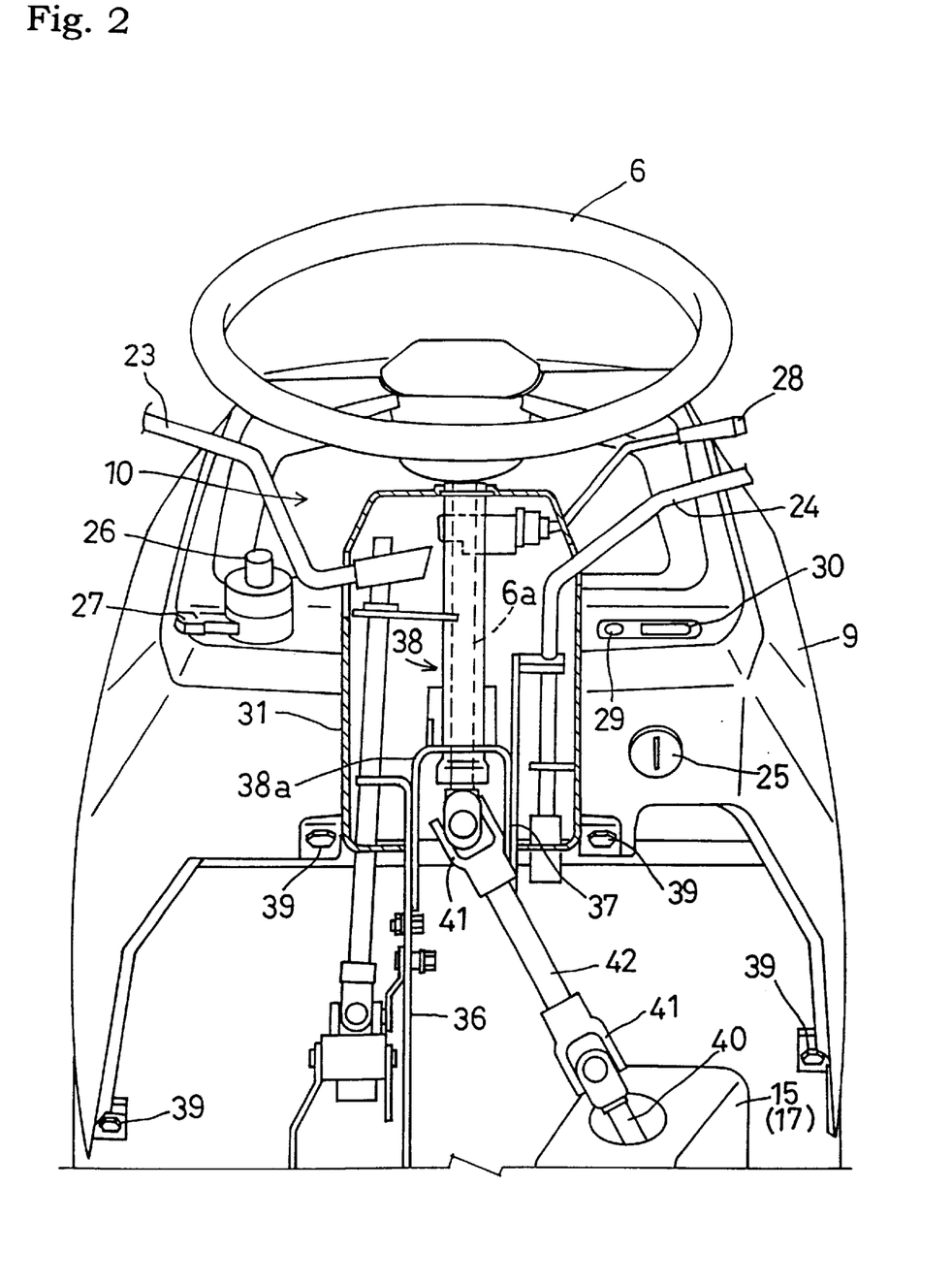
FIG. 2 is a rear view showing a steering-wheel peripheral section which constitutes the principal portion of the construction according to the invention.
Figure 7:
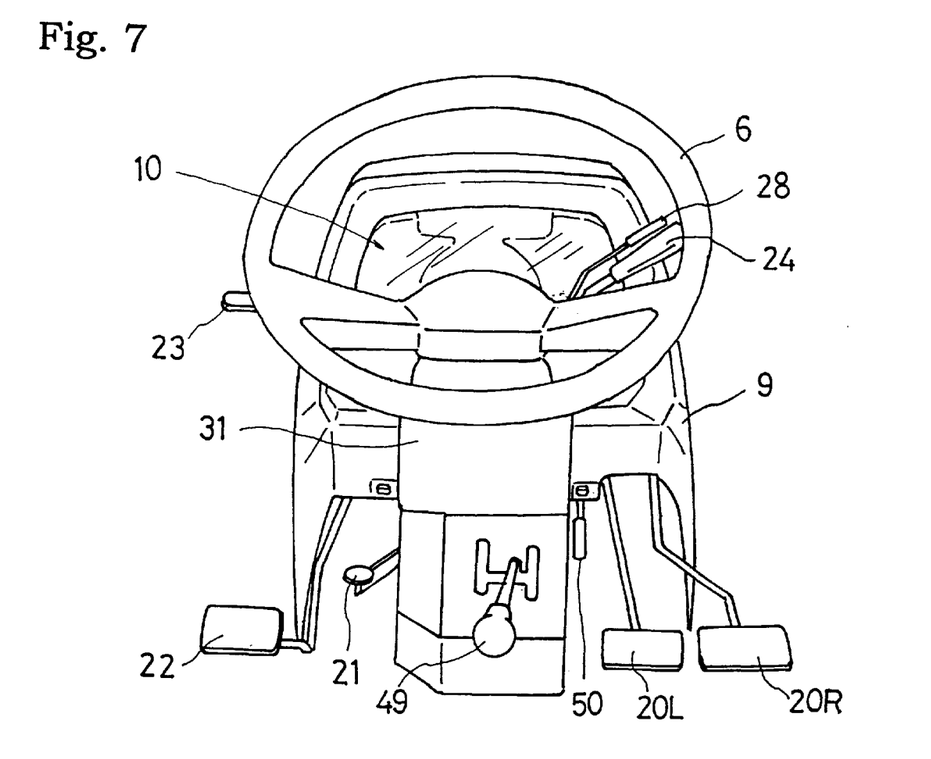
FIG. 7 is a plan view showing arrangement of various control instruments in the steering-wheel peripheral section.

The various control components include, as shown in FIGS. 2 and 7, left and right service clutch-brake pedals 20L, 20R, a tilt-locking/unlocking pedal 21, a main clutch pedal 22, a brake locking lever 50, a forward-reverse switchover lever 23, a hand accelerator lever 24, a main switch 25, a light switch 26, a blinker switch 27, a lift-pumper lever 28, a display-mode switchover switch 29 for the liquid-crystal display section 10b of the instrument panel 10, a propelling-mode switchover switch 30 and so on. Further, downwardly of the panel cover 9, there is rearwardly disposed a PTO speed-change lever 49.

The liquid-crystal display section 10b is capable of selectively providing three modes, i.e. an hour meter mode, a split mode (trip of the hour meter), and a propelling speed mode. These modes may be switched over with a pressing operation of the display-mode switchover switch 29. Further, the propelling mode switchover switch 30 is used for switching over a 2WD mode, a 4WD mode, an accelerated turn mode (for accelerating the front wheels for quicker turn) and an AD mode (for accelerating the front wheels while braking the inner one of the rear wheels relative to the direction of turn).

A steering-wheel column 31 supported by the vehicle frame 17 is disposed rearwardly of the steering-wheel peripheral section (b). The panel cover 9 defines a cutout 32 which engages with the steering-wheel column 31. As shown in FIG. 3, The portion of the panel cover 9 defining the cutout 32 described above is located downwardly and rearwardly of the opening 9a described hereinbefore so as to come into contact with the front face and opposed side faces of the steering-wheel column 31.

When the panel cover 9 is mounted, the steering-wheel column 31 and the panel cover 9 are engaged into each other. A support member 38 rotatably supporting a steering-wheel shaft 6a is bolt-secured, by using a forked attachment piece 38a fixed to the lower portion of the member 38, to left and right vertical plate stays 36, 37 welded to the rear face of the partition wall 15. This support member 38 mounts the steering-wheel column 31 formed of synthetic resin.

The bottom end of the steering-wheel shaft 6a is operatively coupled, via a relay shaft 42, with a steering shaft 40 which extends from a right-lower portion to a right obliquely downward portion of the partition wall 15.

The panel cover 9 includes a vertical face (rear face) 9T facing the driver's seat 11, an upper face 9J and left and right lateral faces 9L, 9R. The panel cover 9 is configured so as to be open in the opposite direction away from the driver's seat 11, i.e. open in the direction facing the front partition wall 15. The vertical face 9T includes a forwardly tilted inclined face portion 9ta defining the opening 9a, an upper face portion 9tb defining mounting holes 48 for the light switch 26, the display mode switchover switch 29 and so on, and a vertical wall face 9tc defining a mounting hole 48 for the main switch 25. The cutout 32 extends across and between the upper face portion 9tb and the vertical wall face 9tc.

Further, a plurality of engaging elements 33 and a plurality of mating engaged elements 34 are provided to the panel cover 9 and to the vehicle frame 17 at respective corresponding portions thereof, respectively. These engaging and engaged elements 33, 34 together provide a plurality of engaging portions (c). With engagement of these engaging portions (c), the panel cover 9 and the vehicle frame 17 are fixed in position relative to each other.

More particularly, the inner face of the panel cover 9 integrally forms a plurality of ribs 9r, each of which is formed flat in the vertical direction and which extends along the opening direction (forward and oblique downward direction) of the panel cover when it is attached. And, recesses 33a are defined at the centers of the leading ends of the respective ribs 9r. These recesses 33a constitute the engaging elements 33. Whereas, to the front face of the vehicle frame 17, there are fixed vertical plate stays defining, at the rear ends thereof, recesses 34a engageable into the recesses 33a of the engaging elements 33. These recesses 34a constitute the engaged elements 34. Then, as these recesses 33a, 34a come into engagement with each other, the panel cover 9 and the vehicle frame 17 are fixed in position in the front-rear as well as lateral directions.

The engaging portions (c) are provided at total five positions, i.e. on the right and left sides of the upper and lower center portions of the panel cover 9 and at the lateral center of the upper end of the cover 9. Then, with engagement of these engaging portions (c) and securing by bolts 39 at total four positions in the vertical face 9T, i.e. at the lower ends of the left and right lateral faces 9L, 9R and on the right and left of the lower end of the steering-wheel column 31, the panel cover 9 is attached to the vehicle frame 17. Accordingly, by operating the four bolts 39, the panel cover 9 is attachable to and detachable from the vehicle frame 17.

Incidentally, the left and right lateral faces 9L, 9R each are configured with certain amount of downward extension so as to cover or substantially cover the steering-wheel peripheral section (b) when viewed sideways. That is, when the tractor is seen sideways, the steering-wheel peripheral section (b), which is a rather complicated or unsightly section crowded with number of components such as the control members including the relay shaft, rods, etc, and other smaller components such as springs, switches, lead wires etc, may be effectively hidden from the view, so as to provide improved appearance.

Other Embodiment

Figure 8:
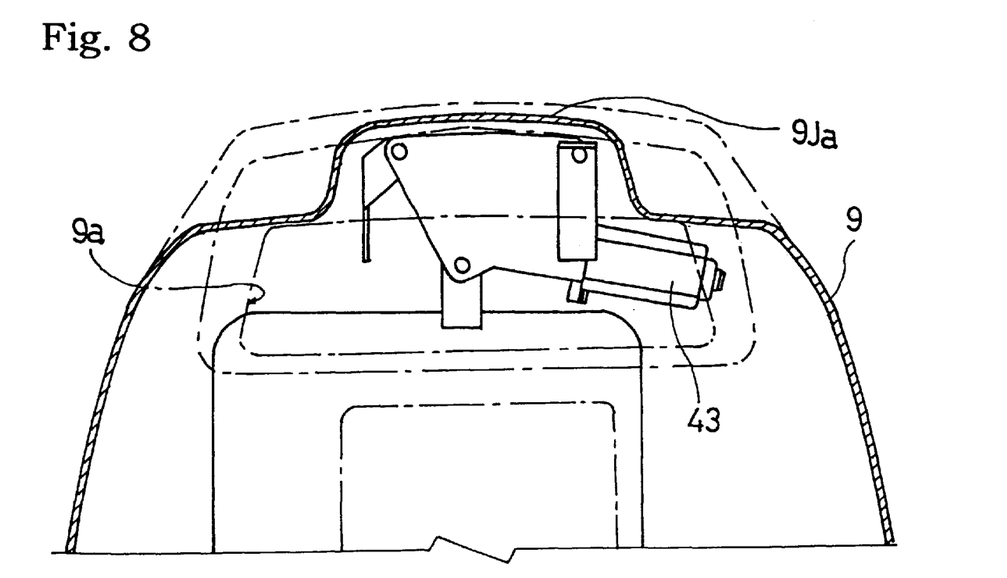
FIG. 8 is a section view showing an upper construction of a panel cover provided in the form of a driver's cabin.
Figure 9:
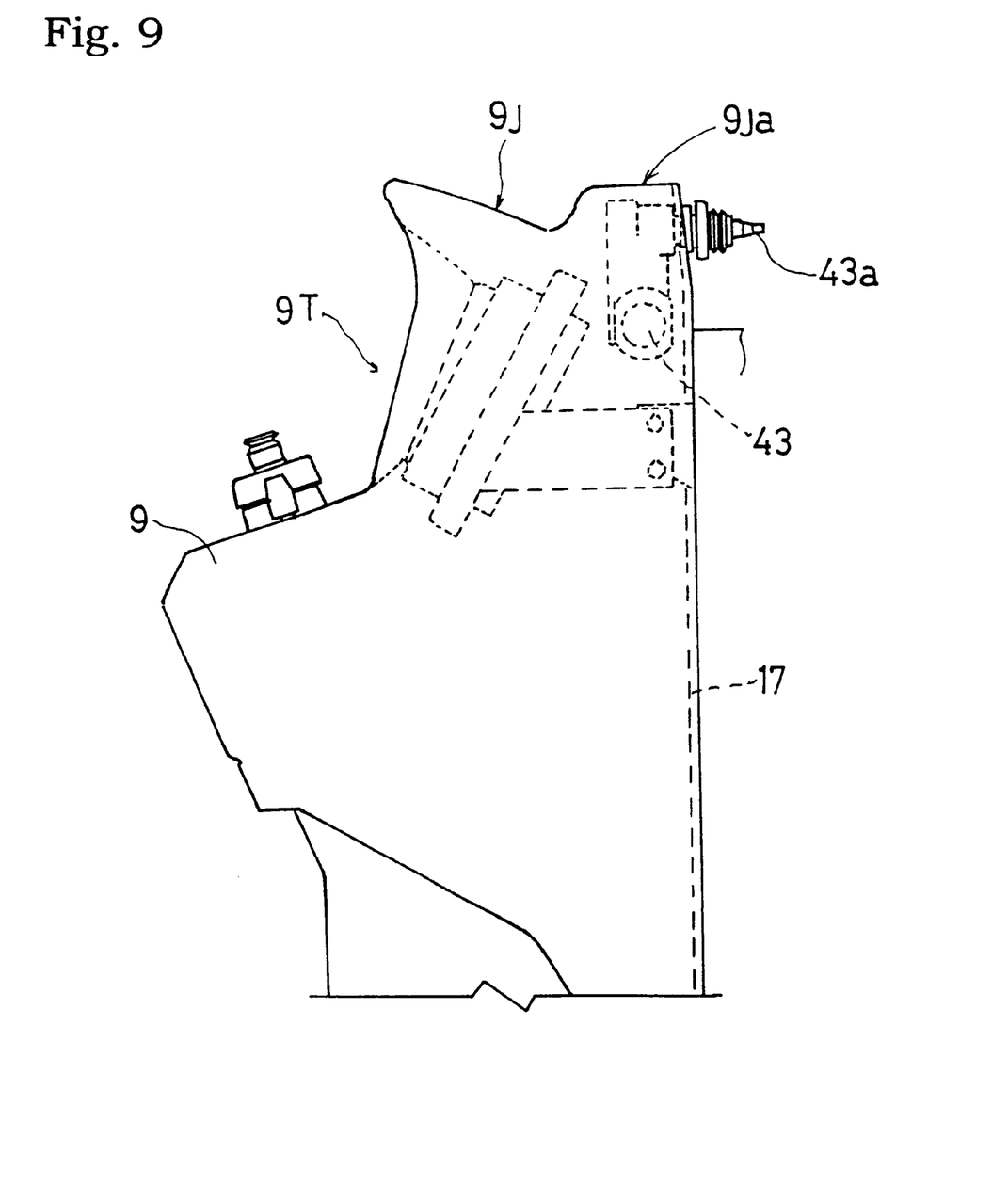
FIG. 9 is a side view showing the upper construction of the panel cover provided in the form of a driver's cabin.

FIGS. 8 and 9 show an alternate panel cover 9 provided in the form of a driver's cabin. In the case of this cabin type construction, compared with the ROPS type construction described hereinbefore, the shape of the vehicle frame 17 is slightly different. The upper face 9J forms, at the front end thereof, a projection 9Ja which is raised relative to the remaining portion. Inside of the projection 9Ja, there is disposed a wiper motor 43 having a driving shaft 43a projecting forwardly. The rest of the construction is substantially the same.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A working vehicle comprising:

a main frame;

a frame member generally extending upward from the main frame and secured to the main frame at a lower edge of the frame member;

an instrument panel secured to the frame member and having a display face; and a panel cover defining an opening for exposing the display face to an operator and covering the periphery of the instrument panel, the panel cover being detachably attached to the working vehicle and wherein the instrument panel remains secured to the frame member when the panel cover is removed from the working vehicle.

2. The working vehicle according to claim 1, wherein said instrument panel is secured to the frame member via a pair of right and left stays which extend substantially horizontally from the frame member.

3. The working vehicle according to claim 1, wherein said panel cover is detachably attached to the frame member.

4. The working vehicle according to claim 1, further comprising a steering-wheel column which is received in a cutout defined in the panel cover.

5. The working vehicle according to claim 4, therein said steering-wheel column is supported by the frame member.

6. The working vehicle according to claim 4, wherein a portion of the panel cover defining the cutout is located downwardly and rearwardly of a portion thereof defining the opening so as to come into contact with a front face and opposed lateral faces of the steering-wheel column.

7. The working vehicle according to claim 1, further including a plurality of engaging elements provided on the panel cover; and a plurality of engaged elements provided on the frame member, and the panel cover and the frame member are fixed in position relative to each other through engagement between the engaging elements and the engaged elements.

8. The working vehicle according to claim 7, wherein the panel cover is open in the opposite direction away from a driver's seat; wherein the panel cover integrally forms in an inner face thereof; a rib extending along an opening direction of the panel cover; and a leading end of the rib extends to the engaging element.

9. The working vehicle according to claim 1, wherein the panel cover includes a vertical face facing a driver's seat, an upper face and a pair of right and left lateral faces.

10. The working vehicle according to claim 1, wherein the frame member has a generally downwardly open U shape, a front edge of the panel cover extending along an outer periphery of the frame member.

11. A working vehicle comprising:

a main frame;

a frame member secured to the main frame, the frame member generally extending upward from the main frame and secured thereto;

an instrument panel secured to the frame member via a pair of stays and having a display face;

a steering-wheel column supported by the frame member; and a panel cover defining an opening for exposing the display face to an operator and covering the periphery of the instrument panel, the panel cover being detachably attached to the working vehicle, the panel cover being detachably attached to the working vehicle via the frame member, the panel cover defining a cutout for receiving the steering-wheel column, and wherein the instrument panel remains secured to the frame member when the panel cover is removed from the working vehicle.

12. A working vehicle comprising:

a main frame;

a frame member secured to said main frame at a lower edge of the frame member, said frame member generally extending upward from said main frame;

an instrument panel supported by said frame member, said instrument panel having a display face;

a plurality of control components supported by said frame member for an operator to control the vehicle; and a panel cover detachably attached to said frame member, said panel cover defining an opening and a cutout, said opening used for exposing said display face to an operator, said cutout used for exposing said control components to an operator, wherein said instrument panel remains secured to said frame member when said panel cover is detached from said frame member.

13. The working vehicle according to claim 12, wherein said panel cover includes right and left lateral faces, and wherein said right and left lateral faces substantially shroud said control components in side view when said panel cover is attached to said frame member.

14. The working vehicle according to claim 12, wherein said frame member includes an inverted U-shaped configuration, and wherein a front edge of said panel cover is fit onto this inverted U-shaped configuration when said panel cover is attached to said frame member.

15. The working vehicle according to claim 12, wherein said control components include a main clutch pedal and left and right service clutch-brake pedals.

* * * * *